（12） United States Patent
Jivan et al.

(10) Patent No.: US 11,587,079 B2
(45) Date of Patent: Feb. 21, 2023

(54) DIGITAL RESOURCE DISTRIBUTION NETWORK MATRIX FOR SECURE INTERACTIONS

(71) Applicant: BANK OF AMERICA CORPORATION, Charlotte, NC (US)

(72) Inventors: Malathi Jivan, San Jose, CA (US); Kathleen Miranda Brand, Boston, MA (US); Michael Donohue, Medfield, MA (US); Justin Riley duPont, Charlotte, NC (US); Christina Ann Lillie, Ann Arbor, MI (US); Jay Derek Prokupek, Charlotte, NC (US); Yash Sharma, Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 212 days.

(21) Appl. No.: 17/210,794

(22) Filed: Mar. 24, 2021

(65) Prior Publication Data

US 2022/0309498 A1    Sep. 29, 2022

(51) Int. Cl.
| | |
|---|---|
| *G06Q 20/40* | (2012.01) |
| *G06F 21/10* | (2013.01) |
| *G06F 16/23* | (2019.01) |
| *G06F 21/62* | (2013.01) |
| *G06Q 20/22* | (2012.01) |
| *G06Q 20/36* | (2012.01) |
| *G06F 16/22* | (2019.01) |

(52) U.S. Cl.
CPC ......... *G06Q 20/40* (2013.01); *G06F 16/2255* (2019.01); *G06F 16/2379* (2019.01); *G06F 21/10* (2013.01); *G06F 21/6218* (2013.01); *G06Q 20/223* (2013.01); *G06Q 20/36* (2013.01); *G06F 2221/0713* (2013.01)

(58) Field of Classification Search
CPC ........ G06Q 20/40; G06Q 20/22; G06Q 20/36; G06F 21/10; G06F 16/23; G06F 16/22; G06F 21/62
See application file for complete search history.

(56) References Cited

U.S. PATENT DOCUMENTS

| | | |
|---|---|---|
| 6,076,074 A | 6/2000 | Cotton et al. |
| 6,298,335 B1 | 10/2001 | Bernstein |
| 6,748,367 B1 | 6/2004 | Lee |
| 7,765,148 B2 | 7/2010 | German et al. |

(Continued)

*Primary Examiner* — Scott S Trotter
(74) *Attorney, Agent, or Firm* — Moore & Van Allen PLLC; Nicholas C. Russell (57) ABSTRACT

Embodiments of the invention are directed to systems, methods, and computer program products for a single degree tiered bracket matrix for secure digital resource distribution across a digital resource distribution network. In this way, the invention interrupts a digital resource distribution network and displays a tiered bracket matrix for a user to select from on the digital resource distribution network application. The tiered bracket matrix is determined by matching database points with an overlayed, timestamped, resource distribution network distributions for prepopulating of the matrix. Upon matching a user device contact hash value, the system may interrupt a resource distribution network application and splice in recommended users for resource distribution via the resource distribution network application in a tiered matrix display.

20 Claims, 4 Drawing Sheets

(56) References Cited

U.S. PATENT DOCUMENTS

| | | |
|---|---|---|
| 7,774,076 B2 | 8/2010 | Skowronek |
| 8,028,896 B2 | 10/2011 | Carter et al. |
| 8,165,381 B1 | 4/2012 | Ferris et al. |
| 8,181,858 B2 | 5/2012 | Carter et al. |
| 8,214,291 B2 | 7/2012 | Pelegero et al. |
| 8,401,904 B1 | 3/2013 | Simakov et al. |
| 8,626,592 B2 | 1/2014 | Simakov et al. |
| 8,630,945 B1 | 1/2014 | Sun et al. |
| 10,019,711 B1 | 7/2018 | Lerner |
| 10,223,675 B2 | 3/2019 | Jones et al. |
| 10,223,688 B2 | 3/2019 | Fahn et al. |
| 10,453,062 B2 | 10/2019 | Wolfs et al. |
| 2014/0013446 A1* | 1/2014 | Patvarczki .......... H04L 61/4594 726/28 |
| 2018/0218356 A1* | 8/2018 | Grassadonia ........ G06Q 20/322 |
| 2020/0372015 A1* | 11/2020 | Baird, III .................. H04L 9/30 |

* cited by examiner

DIGITAL RESOURCE DISTRIBUTION NETWORK MATRIX FOR SECURE INTERACTIONS

BACKGROUND

The development of digital third party exchange sites, individuals are buying and selling products digitally and exchanging resources digitally. With advances in technology, misguidance and identifying users to exchange with may be easier. As such, a need exists for a digital resource network matrix for secure interactions and digital resource exchanges.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention provide for an easy method to identify recipients of digital resources via a digital resource distribution network. Furthermore, the invention provides recipient enrollment within various digital resource distribution networks and provides protection and security for resource distribution across a digital resource distribution network.

In this way, embodiments of the invention identify user connection based on user device contacts and digital resource distribution network users. The system may maintain multiple databased with digital resource distribution network users and financial institution users. The invention maps user interactions with other individuals based on resource distribution and user device contacts to provide a tiered bracket of individuals for user selection for digital resource distribution on a digital resource distribution network.

Current systems have issues with identifying users to transact with across digital resource distribution network and to find out which network a user is on and utilizes. Current systems also have issues with privacy protection of users on their networks.

In this way, the invention provides a single degree tiered bracket matrix for secure digital resource distribution across a digital resource distribution network. The system provides a mechanism to provide a tiered bracket of user contacts on a digital resource distribution network for the user to transact with. On the backend the system maintains database of digital resource distribution network users and financial institution users. Furthermore, on the backend the system provides for capturing of timestamp and user identification of each transaction made by the user. The system builds a database on top of this information to give view of sender compared to recipient in sequences, this overlay database allows for the system to provide tired bracket views to a user faster by allowing for sequencing prepopulating of the tiered brackets.

The system captures timestamps of each digital resource distribution network transaction of the user and determines the sender/recipient of the distribution. This data is utilized to build a backend database on top to provide in digital resource distribution network transaction sequences for pre-populating of the tiered brackets for the user. The system may further cache data to validate on us and third party financial institutions and house a repository of shared hosts.

In some embodiments, the system may further maintain a hash of the contacts of the user, that allows the system to detect updates to the user contact list. In this way, if a user added contact, this will change the hash value of the user contacts in the database, with that hash value change, the system will update the user contact list.

The system maintains a mapping of user interactions/transaction to provide the tiered bracket for the user digital resource distribution network transactions. The system may then integrate into the user's digital resource distribution network and provide a tiered list for user selection of individuals for the digital resource distribution network resource distribution.

Embodiments of the invention relate to systems, methods, and computer program products for a digital resource distribution network matrix, the invention comprising: interconnecting with a digital resource distribution network via generating a communication linkage; hashing, upon user enrollment, user device contacts associated with a user and store a hash value of the user device contacts; extracting and maintaining collaborative identification of one or more digital resource distribution network enrollment status for individuals; capturing timestamped user digital resource distribution activity occurring on a third party digital resource distribution network application; performing tiered bracket matrix processing for prepopulating and staging of tiered bracket matrix; re-hashing the user device contacts and confirm the hash value matches the hash value at user enrollment; identifying the user accessing the digital resource distribution network via a user device; and interrupting connection with the digital resource distribution network and provide a display of individuals in the tiered bracket matrix for user resource distribution via the digital resource distribution network.

In some embodiments, performing the tiered bracket matrix processing for prepopulating and staging of tiered bracket matrix further comprises determining a first degree tiered bracket, a second degree tiered bracket, and a third degree tiered bracket of individuals based on matching the individuals to one or more matrix identifiers: the user device contacts includes the individuals; the user digital resource distribution activity occurring on a third party digital resource distribution network application includes the individuals; and a backend database containing the extracted and maintained collaborative identification of one or more digital resource distribution network enrollment status for individuals contains the individuals.

In some embodiments, the first degree tiered bracket matches an individual to all of the matrix identifiers. In some embodiments, the second degree tiered bracket matches an individual to the user device contacts and the backend database. In some embodiments, the third degree tiered bracket matches an individual to the user device contacts.

In some embodiments, interrupting the connection with the digital resource distribution network and providing a display of individuals in the tiered bracket matrix for user resource distribution via the digital resource distribution network further comprises displaying first degree tiered bracket matches at a top of the display, displaying second degree tiered bracket matches at a middle of the display, and displaying third degree tiered bracket matches at a bottom of the display.

In some embodiments, hashing, upon user enrollment, the user device contacts and store the hash value further comprises tying the hash value to a number of contacts within a user device, such that if a contact is added or deleted from the user device the hash value changes.

In some embodiments, re-hashing the user device contact information and identifying a hash value that is different from the hash value at user enrollment triggers an update of user device contacts and a re-hash of the updated user device contacts.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "transaction" refers to any communication between a user and another user or entity to transfer a product in exchange for resources. A "product" may be a good, service, or ticket to an event, such as a concert, play, movie, sporting event, or the like.

As used herein, the term "resource" may be used to refer to currency or other items exchanged for a product or service. While "a resource distribution" may refer to any paper or digital signal that may transfer or exchange resources, such as funds or currency, across individuals or entities. Resource distribution may include checks, certified checks, automated clearing house, contract, person-to-person payments, credit card payments, debit card payments, transfers of cash, or the like. A "digital third party exchange site" may be an online platform for buyers and sellers to post products for sale or to purchase products. A "product vendor" may be one or more vendors or entities associated with the initial distribution of a product.

As used herein a digital resource distribution network may be a network for transferring resources via a person-to-person (P2P) payment application in coordination with a digital wallet application on the user's mobile device. Here, for example, the system may send the payment to a credit card associated with the recipient. Consequently, the system may present the functionality of the P2P payment application and/or the digital wallet application within the interface of the enhanced resource sharing management application to facilitate completion of the payment transfer. In addition, the system may integrate payment sharing functionality into the interface to enable the user to share or spilt the payment with multiple auxiliary users.

Figure 1:
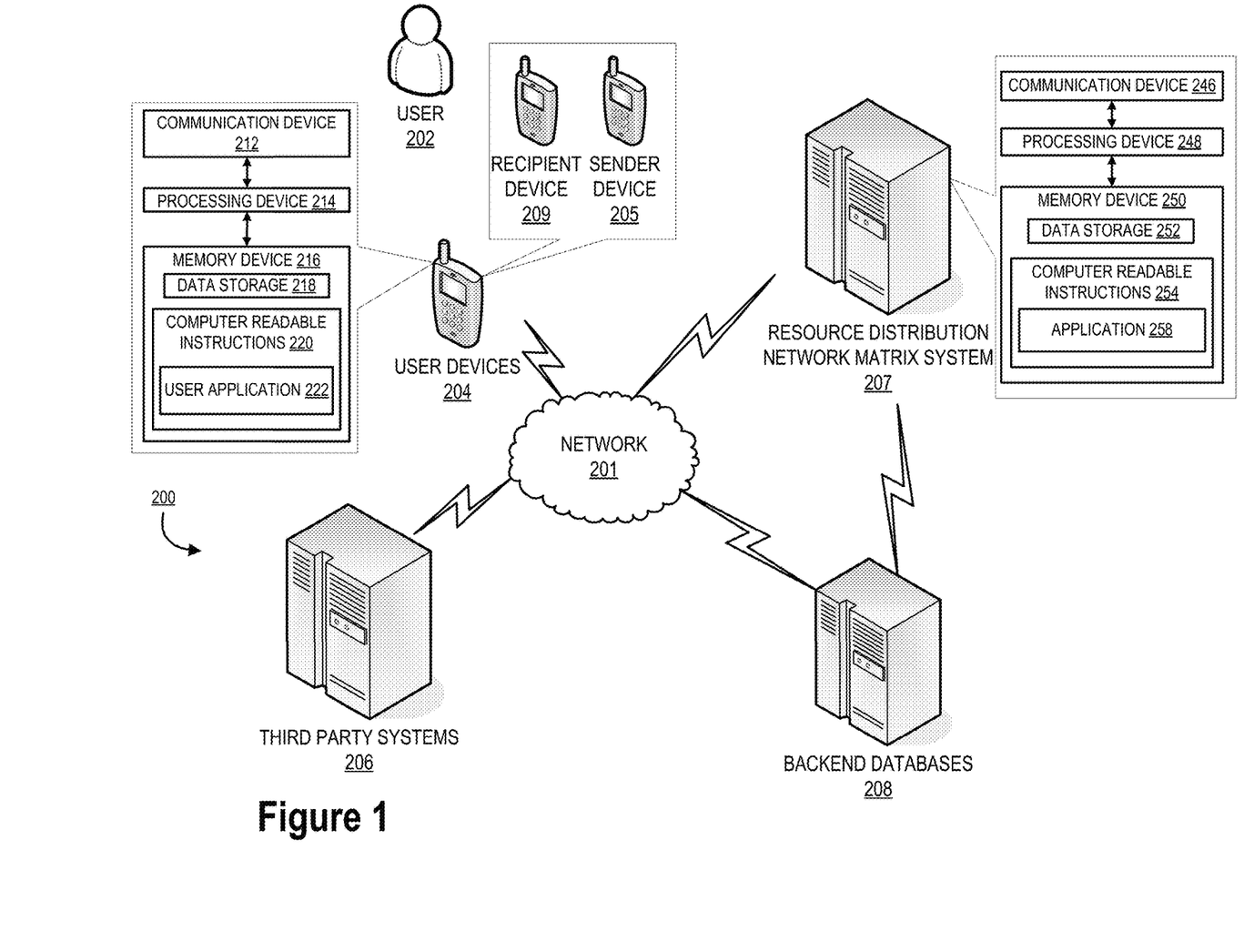
FIG. 1 illustrates a digital resource distribution network matrix system environment, in accordance with embodiments of the present invention.

FIG. 1 illustrates a digital resource distribution network matrix system environment 200, in accordance with embodiments of the present invention. FIG. 1 provides the system environment 200 for which the distributive network system with specialized data feeds associated a digital resource distribution network matrix. FIG. 1 provides a unique system that includes specialized servers and system communicably linked across a distributive network of nodes required to perform the functions of resource exchange verification processing.

As illustrated in FIG. 1, the backend databases 208 are operatively coupled, via a network 201 to the user device 204, resource distribution network matrix system 207, and to the third party systems 206. In this way, the backend databases 208 can send information to and receive information from the user device 204, resource distribution network matrix system 207, and the third party systems 206. The backend databases 208 is in direct communication linkage with the resource distribution network matrix system 207 and the third party systems 206. The backend databases 208 may include a database of users enrolled in digital resource distribution network, a database of financial institution users, and a database of user device 204 hashed contact values. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is one or more individuals sending or receiving resources via a digital resource distribution network. The user may have one or more accounts associated with resources for distribution such as checks, person-to-person payments, debit cards, credit cards, or the like. One or more of these accounts may be associated with a digital resource distribution network. FIG. 1 also illustrates a user device 204. The user device 204 may be the recipient device 209 or the sender device 205 depending on if the user 202 is a sender or receiver of resources via the digital resource distribution network. Both devices may be incorporated into and be the user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the third party systems 206, the backend databases 208, and the resource distribution network matrix system 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to set up marker codes and communicate with the third party systems 206. The recipient device 209 and the sender device 205 may have the same or similar elements as the user device 204.

As further illustrated in FIG. 1, the resource distribution network matrix system 207 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the backend databases 208, the third party systems 206, and the user device 204. As such, the communication device 246 generally comprises a modem, server, or other device for communicating with other devices on the network 201.

As further illustrated in FIG. 1, the resource distribution network matrix system 207 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the resource distribution network matrix system 207 the memory device 250 stores an application 258. Furthermore, the resource distribution network matrix system 207, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more backend databases 208, resource distribution network matrix system 207, and/or user device 204.

As illustrated in FIG. 1, the third party systems 206 is connected to the backend databases 208, user device 204, and resource distribution network matrix system 207. The third party systems 206 has the same or similar components as described above with respect to the user device 204 and the resource distribution network matrix system 207.

It is understood that the servers, systems, and devices described herein illustrate one embodiment of the invention. It is further understood that one or more of the servers, systems, and devices can be combined in other embodiments and still function in the same or similar way as the embodiments described herein. The backend databases 208 may generally include a processing device communicably coupled to devices as a memory device, output devices, input devices, a network interface, a power source, one or more chips, and the like. The backend databases 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. The memory device may store any of a number of applications or programs which comprise computer-executable instructions/code executed by the processing device to implement the functions of the backend databases 208 described herein.

Figure 2:
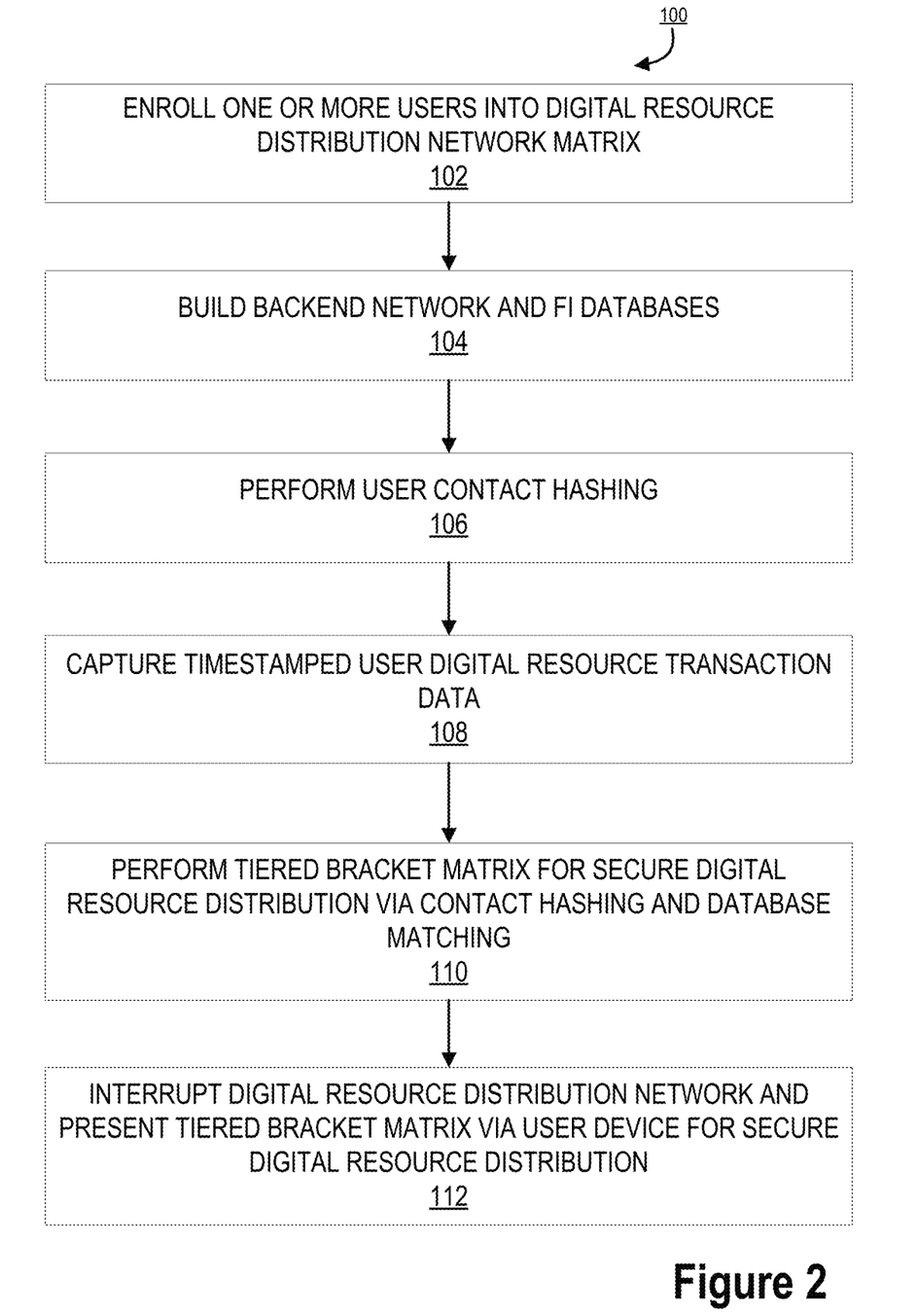
FIG. 2 illustrates a high level flowchart of the digital resource distribution network matrix, in accordance with embodiments of the present invention.

FIG. 2 illustrates a high level flowchart of the digital resource distribution network matrix 100, in accordance with embodiments of the present invention. As illustrated in block 102, the process 100 is initiated by enrolling one or more users into the digital resource distribution network matrix. Enrollment may be included within an application, financial institution application, user device, or the like.

Next, as illustrated in block 104, the process 100 continues by building and updating backend network and financial institution databases. In some embodiments, the system generates and maintains a backend repository of users that are enrolled in one or more digital resource distribution network and the specific digital resource distribution networks the users are enrolled in. In some embodiments, the system generates and maintains a backend repository of users that are customers of the financial institution associated with the system.

As illustrates in block 106, the process 100 continues by performing user contact hashing. In this way, the system may generate a hash value for the contacts within a user's user device. If the user adds or subtracts a contact in the user contact list, the hash value will change. If the hash value changes, the system may trigger a review of the user contact list and update the list to reflect the change in the contact list and re-hash the user contact list.

Next, as illustrated in block 108, the process 100 continues by capturing timestamped user digital resource distribution network transaction data. In this way, the system may identify when a user is transacting using one or more digital resource distribution networks. This may be identified from the financial institution processing and/or via integration into user digital resource distribution networks to identify transactions that the user is attempting to complete via a digital resource distribution network. The system may store this data for processing and determining the matrix and tiered brackets for the user.

As illustrated in block 110, the process 100 continues by performing a tiered bracket matrix for secure digital resource distribution via contact hashing and database matching. In this way, the system may pre-populate a tiered bracket matrix for integration into a user's digital resource distribution network for selection of an individual to send or receive resources from. The tiered bracket may include one or more tiers of individuals the user may transact with via the user's digital resource distribution network. The tiered may be a first degree, second degree, or third degree. The system may display the individuals in each of the matrix degrees on a display within the user's digital resource distribution network application. The individuals within each matrix degree may be selected based on the user contacts and database matching.

As illustrated in block 112, the process 100 continues by interrupting the digital resource distribution network of the user and present the tiered bracket matrix via the user device for secure digital resource distribution. In this way, the system presents the individuals to the user to select for completion of a transaction to that individual using a digital resource distribution network to complete the transaction. The tiered bracket matrix may be tiered based on likelihood the user may select the individual for digital resource distribution network transactions.

Figure 3:
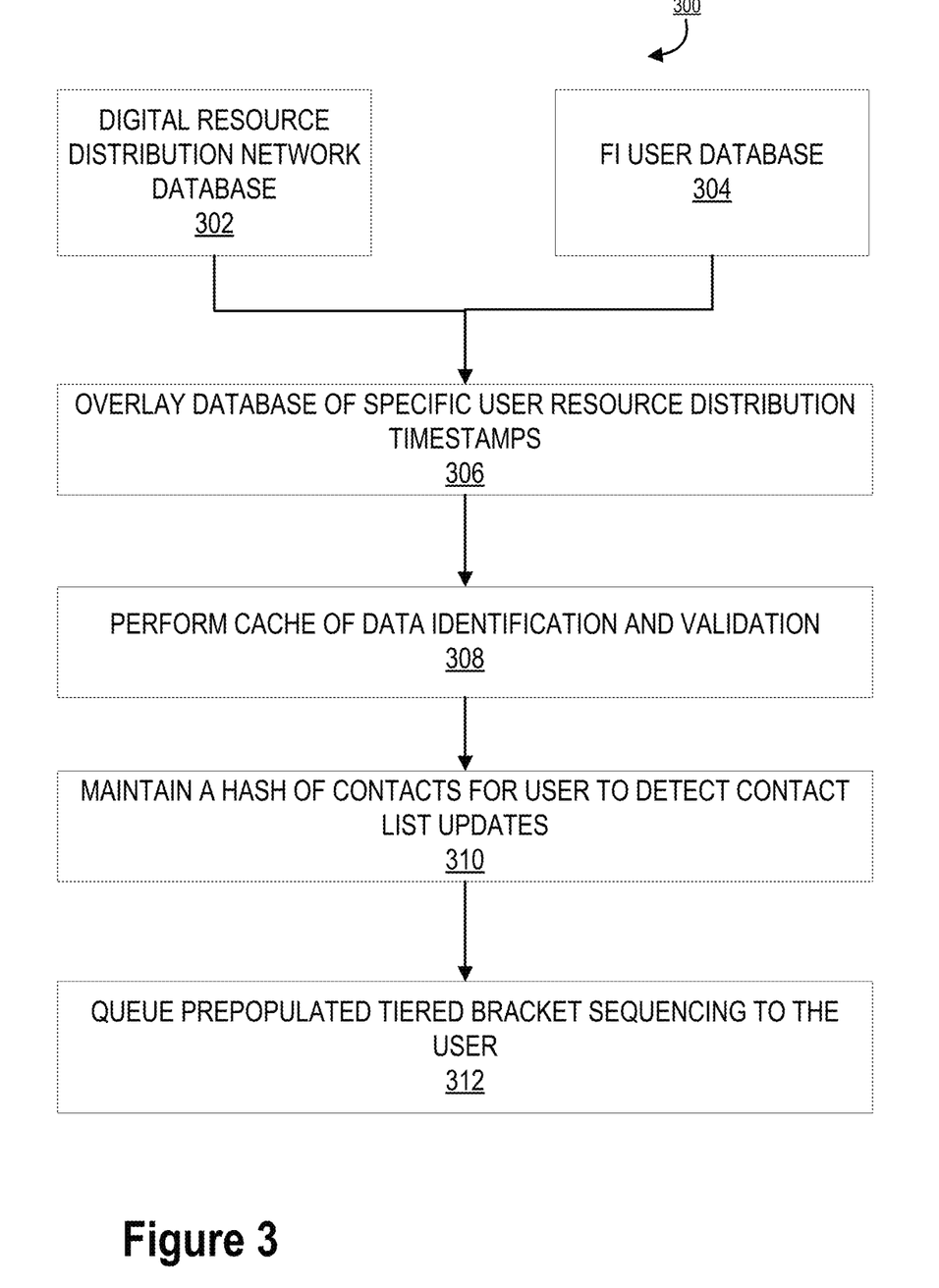
FIG. 3 illustrates a high level flowchart backend data flow for the digital resource distribution network matrix, in accordance with embodiments of the present invention.

FIG. 3 illustrates a high level flowchart backend data flow for the digital resource distribution network matrix 300, in accordance with embodiments of the present invention. The system may comprise of one or more backend databases. In the embodiment illustrated in FIG. 3, there are two backend databases associated with the system, the digital resource distribution network database 302 and the FI user database 304. The digital resource distribution network database 302 may be an internal database or an external database. The digital resource distribution network database 302 comprises a list of individuals or entities and which of the one or more digital resource distribution networks that the individuals or entities are enrolled. This allows for the system to identify individuals and/or entities that are enrolled in the same digital resource distribution networks as the user to identify individuals for the tiered matrix for the user. The FI user database 304 comprises of individuals and/or entities that are associated with or hold accounts at a financial institution that is the same as the user.

As illustrated in block 306, the process 300 continues by overlaying these databases with an overlay database of specific user resource distributions using a digital resource distribution network and the timestamp associated with those distributions. In this way, the system may identify the recent transactions the user has performed and identify the individuals those transactions are with. As such, the system may be able to track recent individuals the user has transacted with in order to place them within the tiered matrix.

Next, as illustrated in block 308, the process 300 continues by caching data identification and validation of the data. Furthermore, as illustrated in block 310, the process 300 continues by maintaining a hash of contacts of the user within the user device of the user in order to detect contact list updates. Maintaining a hash of the contacts of the user allows the system to detect updates to the user contact list. In this way, if a user added contact, this will change the hash value of the user contacts in the database. If the hash value changes, the system may trigger a review of the user contact list and update the list to reflect the change in the contact list and re-hash the user contact list.

Finally, as illustrated in block 312, the process 300 is finalized by queueing a prepopulated tiered bracket sequencing to the user. The tiers may include a first degree tiered bracket, second degree tiered bracket, and third degree tiered bracket. The tiered brackets will be described in further detail below with respect to FIG. 4. The system may determine individuals or entities for the user to transact with via digital resource distribution network based on a tiered system selection. The tiered system selection may be based on user contacts, digital resource distribution network database matching, and FI user database matching.

Figure 4:
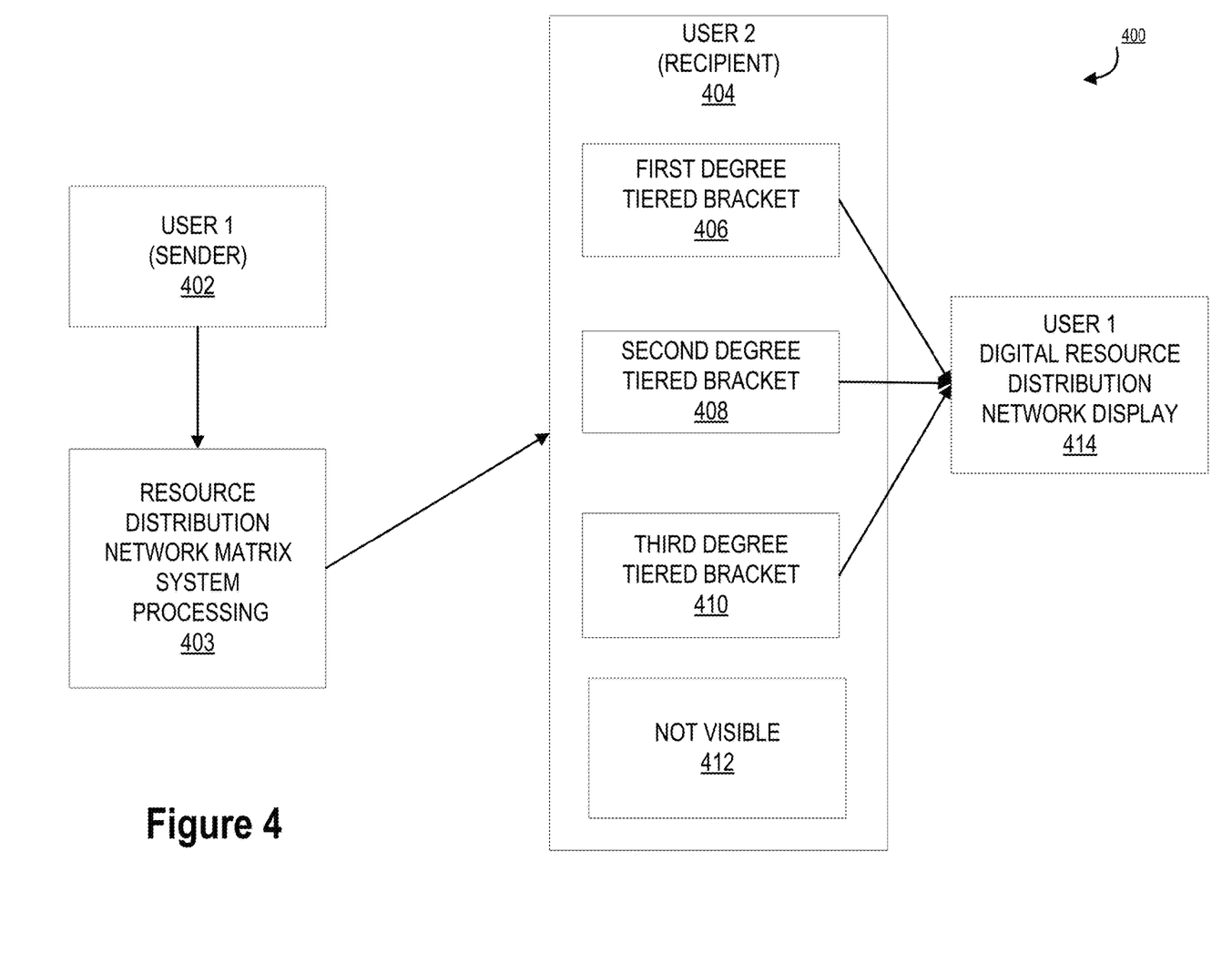
FIG. 4 illustrates a process for displaying the digital resource distribution network matrix to the user, in accordance with embodiments of the present invention.

FIG. 4 illustrates a process for displaying the digital resource distribution network matrix to the user 400, in accordance with embodiments of the present invention. As illustrated, the user in block 402 is a sender of resources via a digital resource distribution network. As illustrated in block 402, User 1 is a sender of resources via a digital resource distribution network. User 1 has a user device that is in connection with a resource distribution network matrix system for resource distribution network matrix system processing, as illustrated in 403. The system does this by generating two backend databases, one digital resource distribution network databased that houses information about the list of individuals or entities that are enrolled on one or more digital resource distribution networks and one FI user database, that houses information about individuals that are customers at the financial institution.

The data on these two databases are then overlayed with a database of specific user resource distributions using a digital resource distribution network and the timestamp associated with those distributions. In this way, the system may identify the recent transactions the user has performed and identify the individuals those transactions are with. As such, the system may be able to track recent individuals the user has transacted with in order to place them within the tiered matrix based on identifying that the recent individuals are in both the two backend databases.

The resource distribution network matrix system processing 403 may perform this overlay and matching. Furthermore, the processing caches data identification and validation of the data and maintains a hash of contacts of the user within the user device of the user in order to detect contact list updates. Maintaining a hash of the contacts of the user allows the system to detect updates to the user contact list. In this way, if a user added contact, this will change the hash value of the user contacts in the database. If the hash value changes, the system may trigger a review of the user contact list and update the list to reflect the change in the contact list and re-hash the user contact list.

The resource distribution network matrix system processing 403 further maintains a mapping of user interactions/transaction to provide the tiered bracket for the user digital resource distribution network transactions. For the example illustrated in FIG. 4, User 2 404 is the recipient of the digital resource distribution network from User 1. The resource distribution network matrix system processing determines the degreed tiered bracket of User 2. There are several degreed tiered brackets, there is a first degree tiered bracket 406, a second degree tiered bracket 408, a third degree tiered bracket 410, or the user may not be visible, as illustrated in block 412.

If User 2 is in the first degree tiered bracket 406 for User 1, this means that User 1 has recently transacted with User 2, User 2 is in User 1's contact list on their user device, User 2 has enrolled the same digital resource distribution network as User 1, and User 2 is a customer of the financial institution.

In a second example, User 1 may wish to utilize a digital resource distribution network to send resources to User 2. Using the databased, the system may identify both User 1 and User 2 as financial institution customers. The system may also identify that User 1 has not transacted with User 2 in the past and that User 2 is in User 1's contact list on the user device. In this example, the system will place User 2 in a second degree tiered bracket, as illustrated in block 408.

In another example, User 1 may wish to utilize a digital resource distribution network to send resources to User 2. Using the databased, the system may identify User 2 as not being a financial institution customer. The system may also identify that User 1 has transacted with User 2 in the past, and that User 2 is in User 1's contact list on the user device. In this example, the system will place User 2 in a third degree tiered bracket, as illustrated in block 410.

In another example, User 1 may wish to utilize a digital resource distribution network to send resources to User 2. Using the databased, the system may identify User 2 as not being a financial institution customer. The system may also identify that User 1 has not transacted with User 2 in the past, and that User 2 is in User 1's contact list on the user device. In this example, the system will place User 2 in tiered bracket not viewable by User 1, in this way, User 2 will not be visible to User 1, as illustrated in block 412.

The system may then integrate into the user's digital resource distribution network and provide a tiered list for user selection of individuals for the digital resource distribution network resource distribution. Finally, as illustrated in block 414, the process 400 is finalized by interrupting the digital resource distribution network application displaying on User 1's user devices and displaying the first, second, and third degree tiered bracket on the user's device to complete the transaction from User 1 to User 2 via the digital resource distribution network.

Current systems have issues with identifying users to transact with across digital resource distribution network and to find out which network a user is on and utilizes. Current systems also have issues with privacy protection of users on their networks.

In this way, the invention provides a single degree tiered bracket matrix for secure digital resource distribution across a digital resource distribution network. The system provides a mechanism to provide a tiered bracket of user contacts on a digital resource distribution network for the user to transact with. On the backend the system maintains database of digital resource distribution network users and financial institution users. Furthermore, on the backend the system provides for capturing of timestamp and user identification of each transaction made by the user. The system builds a database on top of this information to give view of sender compared to recipient in sequences, this overlay database allows for the system to provide tired bracket views to a user faster by allowing for sequencing prepopulating of the tiered brackets.

The system captures timestamps of each digital resource distribution network transaction of the user and determines the sender/recipient of the distribution. This data is utilized to build a backend database on top to provide in digital resource distribution network transaction sequences for prepopulating of the tiered brackets for the user. The system may further cache data to validate on us and third party financial institutions and house a repository of shared hosts.

In some embodiments, the system may further maintain a hash of the contacts of the user, that allows the system to detect updates to the user contact list. In this way, if a user added contact, this will change the hash value of the user contacts in the database, with that hash value change, the system will update the user contact list.

The system maintains a mapping of user interactions/transaction to provide the tiered bracket for the user digital resource distribution network transactions. For an example, User 1 may wish to utilize a digital resource distribution network to send resources to User 2. Using the databased, the system may identify both User 1 and User 2 as financial institution customers. The system may also identify that User 1 has transacted with User 2 in the past and that User 2 is in User 1's contact list on the user device. In this example, the system will place User 2 in a first degree tiered bracket.

In a second example, User 1 may wish to utilize a digital resource distribution network to send resources to User 2. Using the databased, the system may identify both User 1 and User 2 as financial institution customers. The system may also identify that User 1 has not transacted with User 2 in the past and that User 2 is in User 1's contact list on the user device. In this example, the system will place User 2 in a second degree tiered bracket.

In another example, User 1 may wish to utilize a digital resource distribution network to send resources to User 2. Using the databased, the system may identify User 2 as not being a financial institution customer. The system may also identify that User 1 has transacted with User 2 in the past, and that User 2 is in User 1's contact list on the user device. In this example, the system will place User 2 in a third degree tiered bracket.

In another example, User 1 may wish to utilize a digital resource distribution network to send resources to User 2. Using the databased, the system may identify User 2 as not being a financial institution customer. The system may also identify that User 1 has not transacted with User 2 in the past, and that User 2 is in User 1's contact list on the user device. In this example, the system will place User 2 in tiered bracket not viewable by User 1.

The system may then integrate into the user's digital resource distribution network and provide a tiered list for user selection of individuals for the digital resource distribution network resource distribution.

Embodiments of the invention relate to systems, methods, and computer program products for a digital resource distribution network matrix, the invention comprising: interconnecting with a digital resource distribution network via generating a communication linkage; hashing, upon user enrollment, user device contacts associated with a user and store a hash value of the user device contacts; extracting and maintaining collaborative identification of one or more digital resource distribution network enrollment status for individuals; capturing timestamped user digital resource distribution activity occurring on a third party digital resource distribution network application; performing tiered bracket matrix processing for prepopulating and staging of tiered bracket matrix; re-hashing the user device contacts and confirm the hash value matches the hash value at user enrollment; identifying the user accessing the digital resource distribution network via a user device; and interrupting connection with the digital resource distribution network and provide a display of individuals in the tiered bracket matrix for user resource distribution via the digital resource distribution network.

In some embodiments, performing the tiered bracket matrix processing for prepopulating and staging of tiered bracket matrix further comprises determining a first degree tiered bracket, a second degree tiered bracket, and a third degree tiered bracket of individuals based on matching the individuals to one or more matrix identifiers: the user device contacts includes the individuals; the user digital resource distribution activity occurring on a third party digital resource distribution network application includes the individuals; and a backend database containing the extracted and maintained collaborative identification of one or more digital resource distribution network enrollment status for individuals contains the individuals.

In some embodiments, the first degree tiered bracket matches an individual to all of the matrix identifiers. In some embodiments, the second degree tiered bracket matches an individual to the user device contacts and the backend database. In some embodiments, the third degree tiered bracket matches an individual to the user device contacts.

In some embodiments, interrupting the connection with the digital resource distribution network and providing a display of individuals in the tiered bracket matrix for user resource distribution via the digital resource distribution network further comprises displaying first degree tiered bracket matches at a top of the display, displaying second degree tiered bracket matches at a middle of the display, and displaying third degree tiered bracket matches at a bottom of the display.

In some embodiments, hashing, upon user enrollment, the user device contacts and store the hash value further comprises tying the hash value to a number of contacts within a user device, such that if a contact is added or deleted from the user device the hash value changes.

In some embodiments, re-hashing the user device contact information and identifying a hash value that is different from the hash value at user enrollment triggers an update of user device contacts and a re-hash of the updated user device contacts.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for a digital resource distribution network matrix, the system comprising:
   a memory device with computer-readable program code stored thereon;
   a communication device;
   a processing device operatively coupled to the memory device and the communication device, wherein the processing device is configured to execute the computer-readable program code to:
   interconnect with a digital resource distribution network via generating a communication linkage;
   hash, upon user enrollment, user device contacts associated with a user and store a hash value of the user device contacts;
   extract and maintain collaborative identification of one or more digital resource distribution network enrollment status for individuals;
   capture timestamped user digital resource distribution activity occurring on a third party digital resource distribution network application;
   perform tiered bracket matrix processing for prepopulating and staging of tiered bracket matrix;
   re-hash the user device contacts and confirm the hash value matches the hash value at user enrollment;
   identify the user accessing the digital resource distribution network via a user device; and
   interrupt connection with the digital resource distribution network and provide a display of individuals in the tiered bracket matrix for user resource distribution via the digital resource distribution network.

2. The system of claim 1, wherein performing the tiered bracket matrix processing for prepopulating and staging of tiered bracket matrix further comprises determining a first degree tiered bracket, a second degree tiered bracket, and a third degree tiered bracket of individuals based on matching the individuals to one or more matrix identifiers:
   the user device contacts includes the individuals;
   the user digital resource distribution activity occurring on a third party digital resource distribution network application includes the individuals; and
   a backend database containing the extracted and maintained collaborative identification of one or more digital resource distribution network enrollment status for individuals contains the individuals.

3. The system of claim 2, wherein the first degree tiered bracket matches an individual to all of the matrix identifiers.

4. The system of claim 2, wherein the second degree tiered bracket matches an individual to the user device contacts and the backend database.

5. The system of claim 2, wherein the third degree tiered bracket matches an individual to the user device contacts.

6. The system of claim 1, wherein interrupting the connection with the digital resource distribution network and providing a display of individuals in the tiered bracket matrix for user resource distribution via the digital resource distribution network further comprises displaying first degree tiered bracket matches at a top of the display, displaying second degree tiered bracket matches at a middle of the display, and displaying third degree tiered bracket matches at a bottom of the display.

7. The system of claim 1, wherein hashing, upon user enrollment, the user device contacts and store the hash value further comprises tying the hash value to a number of contacts within a user device, such that if a contact is added or deleted from the user device the hash value changes.

8. The system of claim 1, wherein re-hashing the user device contact information and identifying a hash value that is different from the hash value at user enrollment triggers an update of user device contacts and a re-hash of the updated user device contacts.

9. A computer program product for a digital resource distribution network matrix with at least one non-transitory computer-readable medium having computer-readable program code portions embodied therein, the computer-readable program code portions comprising:
   an executable portion configured for interconnecting with a digital resource distribution network via generating a communication linkage;
   an executable portion configured for hashing, upon user enrollment, user device contacts associated with a user and store a hash value of the user device contacts;
   an executable portion configured for extracting and maintaining collaborative identification of one or more digital resource distribution network enrollment status for individuals;
   an executable portion configured for capturing timestamped user digital resource distribution activity occurring on a third party digital resource distribution network application;
   an executable portion configured for performing tiered bracket matrix processing for prepopulating and staging of tiered bracket matrix;
   an executable portion configured for re-hashing the user device contacts and confirm the hash value matches the hash value at user enrollment;
   an executable portion configured for identifying the user accessing the digital resource distribution network via a user device; and
   an executable portion configured for interrupting connection with the digital resource distribution network and provide a display of individuals in the tiered bracket matrix for user resource distribution via the digital resource distribution network.

10. The computer program product of claim 9, wherein performing the tiered bracket matrix processing for prepopulating and staging of tiered bracket matrix further comprises determining a first degree tiered bracket, a second degree tiered bracket, and a third degree tiered bracket of individuals based on matching the individuals to one or more matrix identifiers:
the user device contacts includes the individuals;
the user digital resource distribution activity occurring on a third party digital resource distribution network application includes the individuals; and
a backend database containing the extracted and maintained collaborative identification of one or more digital resource distribution network enrollment status for individuals contains the individuals.

11. The computer program product of claim 10, wherein the first degree tiered bracket matches an individual to all of the matrix identifiers.

12. The computer program product of claim 10, wherein the second degree tiered bracket matches an individual to the user device contacts and the backend database.

13. The computer program product of claim 10, wherein the third degree tiered bracket matches an individual to the user device contacts.

14. The computer program product of claim 9, wherein interrupting the connection with the digital resource distribution network and providing a display of individuals in the tiered bracket matrix for user resource distribution via the digital resource distribution network further comprises displaying first degree tiered bracket matches at a top of the display, displaying second degree tiered bracket matches at a middle of the display, and displaying third degree tiered bracket matches at a bottom of the display.

15. The computer program product of claim 9, wherein hashing, upon user enrollment, the user device contacts and store the hash value further comprises tying the hash value to a number of contacts within a user device, such that if a contact is added or deleted from the user device the hash value changes.

16. The computer program product of claim 9, wherein re-hashing the user device contact information and identifying a hash value that is different from the hash value at user enrollment triggers an update of user device contacts and a re-hash of the updated user device contacts.

17. A computer-implemented method for a digital resource distribution network matrix, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
interconnecting with a digital resource distribution network via generating a communication linkage;
hashing, upon user enrollment, user device contacts associated with a user and store a hash value of the user device contacts;
extracting and maintaining collaborative identification of one or more digital resource distribution network enrollment status for individuals;
capturing timestamped user digital resource distribution activity occurring on a third party digital resource distribution network application;
performing tiered bracket matrix processing for prepopulating and staging of tiered bracket matrix;
re-hashing the user device contacts and confirm the hash value matches the hash value at user enrollment;
identifying the user accessing the digital resource distribution network via a user device; and
interrupting connection with the digital resource distribution network and provide a display of individuals in the tiered bracket matrix for user resource distribution via the digital resource distribution network.

18. The computer-implemented method of claim 17, wherein performing the tiered bracket matrix processing for prepopulating and staging of tiered bracket matrix further comprises determining a first degree tiered bracket, a second degree tiered bracket, and a third degree tiered bracket of individuals based on matching the individuals to one or more matrix identifiers:
the user device contacts includes the individuals;
the user digital resource distribution activity occurring on a third party digital resource distribution network application includes the individuals; and
a backend database containing the extracted and maintained collaborative identification of one or more digital resource distribution network enrollment status for individuals contains the individuals.

19. The computer-implemented method of claim 17, wherein interrupting the connection with the digital resource distribution network and providing a display of individuals in the tiered bracket matrix for user resource distribution via the digital resource distribution network further comprises displaying first degree tiered bracket matches at a top of the display, displaying second degree tiered bracket matches at a middle of the display, and displaying third degree tiered bracket matches at a bottom of the display.

20. The computer-implemented method of claim 17, wherein re-hashing the user device contact information and identifying a hash value that is different from the hash value at user enrollment triggers an update of user device contacts and a re-hash of the updated user device contacts.

* * * * *